July 28, 1959

J. J. GREVICH 2,896,461

VARIABLE PITCH PULLEYS

Original Filed Feb. 16, 1955

INVENTOR
John J. Grevich
BY Robert M. Dunning
ATTORNEY

United States Patent Office 2,896,461
Patented July 28, 1959

2,896,461

VARIABLE PITCH PULLEYS

John J. Grevich, New Richmond, Wis., assignor to Doughboy Industries, Inc., New Richmond, Wis., a corporation of Wisconsin Continuation of application Serial No. 488,691, February 16, 1955. This application July 28, 1958, Serial No. 751,575

8 Claims. (Cl. 74—230.17)

This invention relates to an improvement in variable pitch pulleys and deals particularly with a simple pulley which is of variable effective diameter. Various types of pulleys have been constructed which are of varying pitch. In most constructions of this type, the pitch or diameter of the pulley is manually variable. In such cases the radius at which the V-bolt engages the pulley may be regulated by relative movement between two generally conical elements. In the present structure the radius at which the belt engages the pulley is automatically varied by regulating the tension of the belt. An object of the present invention relates to the provision of a pulley having a generally conical flange which is in a fixed position and in providing a second opposed conical flange slidably mounted relative to the first. Resilient means engages the slidable pulley portion to urge it toward a position in which the belt will engage the pulley at a maximum radius. If the pull upon the belt is increased, the slidable portion will move away from the fixed conical portion to permit the belt to engage the pulley at a lesser radius.

A feature of the present invention resides in the simplicity of the contsruction. The device comprises an extremely small number of parts and, as a result, can be economically constructed and produced.

A further feature of the present invention resides in the manner in which the pulley is mounted upon a shaft. In the preferred form of construction, a set screw is provided through the fixed pulley portion, the set screw being engageable with the shaft. The set screw is normally concealed inwardly of the movable portion of the pulley but is readily accessible when the movable pulley portion is moved away from the fixed flange.

A further feature of the present invention resides in the provision of a variable pitch pulley having a fixed part including a hub and a generally frusto conical flange and a detachable flange at its opposite end. A movable pulley portion is slidable upon the hub and includes a sleeve encircling the hub and a frusto conical flange at one end thereof in opposed relation to the fixed flange, resilient means encircling the sleeve and interposed between the flange of the movable part and the detachable flange. Thus, the movable pulley member can slide by compressing the resilient means. Preferably a bearing is provided between the hub and the sleeve and the sleeve is keyed or splined to the hub.

This application is a continuation of my previous application Serial No. 488,691, filed February 16, 1955, now abandoned.

These and other objects and novel features of my invention will be more clearly and fully set forth in the following specification and claims.

In the drawings forming a part of the specification:

The variable pitch pulley is illustrated in general by the letter A. The pulley is designed for mounting upon a shaft 10 such as a motor shaft or the like. The pulley is designed to rotate upon rotation of the shaft 10.

Figure 3:
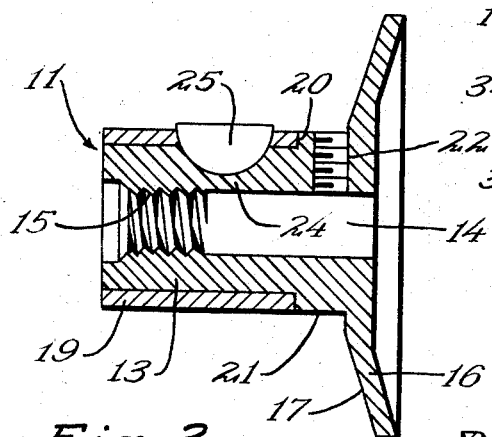
Figure 3 is a sectional view through the fixed portion of the pulley with the detachable flange detached therefrom.
Figure 4:
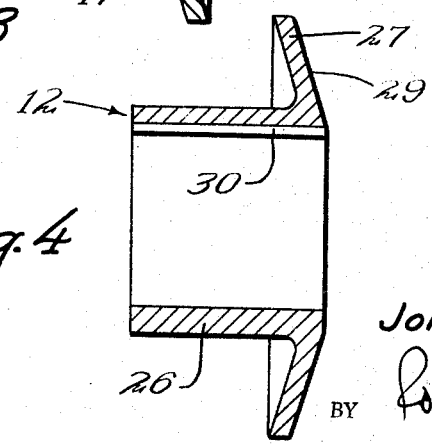
Figure 4 is a sectional view through the slidable portion of the pulley.

The pulley in general includes a fixed portion 11 best illustrated in Figure 3 of the drawings and a movable portion 12 best illustrated in Figure 4 of the drawings. Removable portion 12 is slidable upon the fixed portion 11.

The immovable portion 11 includes a hub 13 having an axial socket 14 therein designed to accommodate the shaft 10. One end of the socket 14 is internally threaded as indicated at 15. At the other end of the hub 13 a frusto conical flange 16 projects outwardly from the hub, the frusto conical inner surface 17 thereof, against which a pulley belt may engage, being on the side of the flange toward the body of the hub 13.

A bearing sleeve 19 is pressed or otherwise secured upon the hub 13, the end of the bearing 19 engaging against a shoulder 20 on the hub. The shoulder 20 is between a smaller diameter portion about which the bearing 19 extends and a larger diameter portion 21 which is of the same outer diameter as the bearing 19.

An internally threaded aperture 22 extends radially through the hub 13 at a point closely adjacent to the fly 16. This aperture 22 is designed to accommodate a set screw 23 engageable against the shaft 10 to hold the hub 13 from rotation.

A key socket 24 is formed through the bearing 19 and into the hub 13. The key socket 24 supports a key 25 which projects somewhat beyond the periphery of the bearing 19 for the purpose which will be later described.

Figure 1:
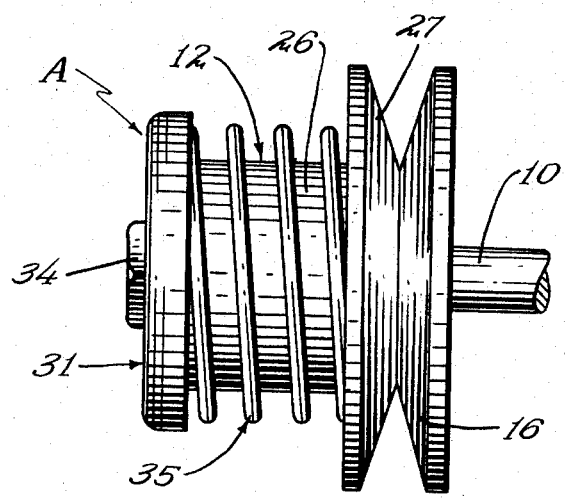
Figure 1 is an elevation view of the pulley showing the general arrangement thereof.

The movable portion 12 of the pulley includes a sleeve 26 of proper internal diameter to fit with a slidable fit over the bearing 19, and this sleeve is provided with a frusto conical flange 27 at one end thereof. The flange 27 is arranged with its belt engaging surface 29 directed away from the body of the sleeve 26. Accordingly, in the assembled condition of the pulley shown in Figures 1 and 2, the pulley surfaces 17 and 29 are in opposed diverging relation and form a V-shaped groove for the accommodation of a V-belt.

The sleeve 26 is provided with a longitudinally extending keyway 30 designed to accommodate the key 25. Thus, the movable pulley portion 12 may slide longitudinally of the hub 13 but is held from rotation relative thereto.

Figure 2:
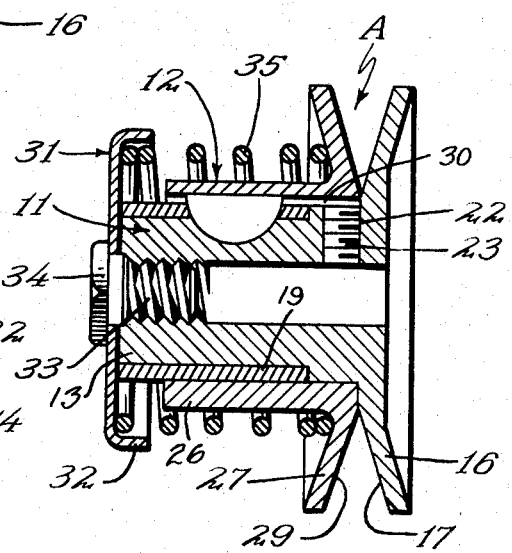
Figure 2 is a sectional view through the pulley shown in Figure 1.

A spring retaining flange element 31 is provided on the end of the hub 13 opposite the end bearing the flange 16. The element 31 comprises a ring-shaped disc having a generally cylindrical peripheral flange 32 thereon. A cap screw 33 extends into the threaded portion 15 of the socket 14 and the cap screw head engages outwardly of the ring-shaped disc to hold the disc flat against the end of the hub 13 and encircling bearing 19. The flange 32 is directed toward the flanges 16 and 27 as indicated in Figure 2.

A spring 35 is interposed between the spring retaining flange element 31 and the flange 27 of the movable pulley portion 12. A spring 35 tends to hold the end of the sleeve 26 against the flange 16 of the fixed pulley portion. The movable pulley portion normally overlies the set screw aperture 22, but the set screw 23 is accessible when the movable pulley portion is drawn into spring compressing position.

The operation of the pulley is believed obvious from the foregoing description. However, it should be understood that the pulley will engage the belt at varying radii depending upon the pull exerted upon the belt. In other words, in order to decrease the radius at which the belt engages the pulley, it is only necessary to increase the tension on the belt, as by moving the shaft on which the pulley is mounted or a second parallel shaft so as to increase the distance between the shafts. As the tension upon the belt is increased, the belt acts to push the movable portion of the pulley away from the flange of the fixed portion so that the belt may extend more deeply into the V-shaped notch by increasing the distance between the conical flanges.

The simplicity of the device is of primary importance. Due to the simplicity of the structure the pulleys may be made at a relatively low cost and serve an important function.

In accordance with the patent statutes, I have described the principles of construction and operation of my variable pitch pulleys, and while I have endeavored to set forth the best embodiment thereof, I desire to have it understood that obvious changes may be made within the scope of the following claims without departing from the spirit of my invention.

I claim:

1. A variable pitch pulley including a fixed pulley portion including a hub having an axial shaft socket therein and a frusto conical flange on the socketed end of said hub, the end of the hub adjacent to said flange being of larger diameter and the other end of said hub being of reduced diameter, a bearing encircling said reduced diameter hub portion and having an external diameter equal to the diameter of the larger diameter portion of said hub, a sleeve slidably supported on said bearing and having an end normally overlying the larger diameter portion of said hub, a second frusto conical flange on said sleeve, said flanges having diverging surfaces, a flange means, threaded means extending through said flange means and extending axially into said hub, said flange means engaging said bearing and the end of the small diameter portion of said hub, and spring means interposed between said flange means and said second frusto conical flange, and means holding said hub, bearing and sleeve from relative rotation.

2. The structure of claim 1 and in which the last named means includes a key extending through said bearing and into said hub, and said sleeve having a keyway extending axially thereof in which said key may slide.

3. The structure of claim 1 and including a set screw extending radially through said large diameter hub portion and into said shaft socket.

4. A variable pitch pulley including a fixed pulley portion including a hub having an axial shaft aperture therein and a frusto conical flange on one end thereof, the end of the hub adjacent to said flange being of larger diameter and the other end of said hub being of reduced diameter, a bearing encircling said reduced diameter hub portion and having an external diameter equal to the diameter of the larger diameter portion of the hub, a sleeve slidably supported on said bearing and having an end normally overlying the larger diameter portion of said hub, a second frusto conical flange on said sleeve, said flanges having diverging surfaces, a flange means, means securing said flange means adjoining the smaller diameter end of said hub, and spring means interposed between said flange means and said second frusto conical flange, and means holding said hub, bearing, and sleeve from relative rotation.

5. The structure of claim 4 and in which the last named means includes a key extending through said bearing and into said hub, and said sleeve having a keyway extending axially thereof in which said key may slide.

6. The structure of claim 4 and including a set screw extending radially through said large diameter hub portion and into said shaft aperture.

7. A variable pitch pulley including a fixed pulley portion including a hub having an axial shaft aperture therein and a frusto conical flange on one end of the hub, a bearing encircling said hub and terminating in spaced relation to said frusto conical flange, a sleeve slidably supported on said bearing and having an end projecting beyond the end of said bearing nearest said frusto conical flange, a second frusto conical sleeve on said sleeve, said flanges having diverging surfaces, a flange means, means securing said flange means adjacent the end of the hub and bearing most remote from said first frusto conical flange, spring means interposed between said flange means and said second frusto-conical flange, and means holding the hub, bearing and sleeve from relative rotation.

8. A variable pitch pulley including a fixed pulley portion including a hub having an axial shaft aperture therein and a frusto-conical flange on one end thereof, a bearing encircling said hub and terminating in spaced relation to said frusto-conical flange, a sleeve slidably supported on said bearing and having an end projecting beyond the end of said bearing nearest said flange, a second frusto-conical flange on said projecting end of said sleeve, said flanges having diverging surfaces, means holding said sleeve from rotation relative to said bearing and to said hub, a flange means secured adjacent to the other end of said hub, and spring means interposed between said flange means and said second flange.

References Cited in the file of this patent

UNITED STATES PATENTS

| 2,037,436 | Roddewig | Apr. 14, 1936 |
| 2,135,214 | Moore | Nov. 1, 1938 |
| 2,299,036 | Rivers | Oct. 13, 1942 |

FOREIGN PATENTS

| 435,257 | Great Britain | Sept. 18, 1935 |
| 953,557 | France | May 23, 1949 |
| 678,832 | Great Britain | Sept. 10, 1952 |